United States Patent [19]
Haldeman

[11] 3,890,950  
[45] June 24, 1975

[54] PISTON LUBRICATING  
[75] Inventor: Charles W. Haldeman, Concord, Mass.  
[73] Assignee: Megatech Corporation, Billerica, Mass.  
[22] Filed: Oct. 2, 1973  
[21] Appl. No.: 402,708

[52] U.S. Cl........ 123/193 P; 123/193 CP; 161/162; 161/170  
[51] Int. Cl............................................. F02f 23/00  
[58] Field of Search ...... 123/193 R, 193 P, 193 CP, 123/191 A; 92/213, 224; 161/162, 170, 169

[56]  References Cited  
UNITED STATES PATENTS

| | | | |
|---|---|---|---|
| 2,271,024 | 1/1942 | Nicolle | 92/224 |
| 2,806,751 | 9/1957 | Sykes | 92/224 |
| 2,833,264 | 5/1958 | Dailey | 123/193 P |
| 2,833,668 | 5/1958 | Dailey | 123/193 P |
| 3,004,336 | 10/1961 | Timuska | 92/224 |
| 3,289,649 | 12/1966 | Lamm | 123/193 C |
| 3,783,068 | 1/1974 | Brown | 161/170 |

Primary Examiner—Manuel A. Antonakas  
Assistant Examiner—Daniel J. O'Connor  
Attorney, Agent, or Firm—Charles Hieken, Esq.; Jerry Cohen, Esq.

[57] ABSTRACT

A self-lubricating piston for an internal combustion engine comprises a composite coating adhered to a grooved piston surface and containing therein a first reinforcing phase of high tensile strength, high modulus of elasticity, reinforcing fibers of graphitic structure and a second reinforcing phase of powdered solid lubricant. The fibers are spooled around the piston and continuous for at least two turns. The fibers are preferably contacted along their lengths with longitudinally discontinuous bands of high thermal conductivity soft material forming multiple radial heat transfer paths throughout the composite layer.

8 Claims, 4 Drawing Figures

PISTON LUBRICATING

BACKGROUND OF THE INVENTION

The present invention relates to internal combustion engines operating without liquid lubrication and more particularly to self-lubricating pistons for engines that perform well while eliminating the annoyances and disadvantages associated with liquid lubrication and reducing pollution.

It is an important object of the present invention to provide self-lubricating piston structure which is resistant to erosion and wear.

It is a further object of the invention to provide a piston bearing surface layer supported on a piston made of dissimilar material consistent with the preceding object.

It is a further object of the invention to provide a piston bearing surface layer which is resistant to deformation in combustion engine use consistent with one or both of the preceding objects.

It is a further object of the invention to provide a continuous ring or cylindrical surface surrounding the piston and bonded thereto to prevent leakage of gas under the bearing surface consistent with one or more of the preceding objects.

It is a further object of the invention to provide maximum tensile strength in a bearing layer so that it may be thin to provide heat transfer from the piston to the cylinder consistent with one or more of the preceding objects.

It is a further object of the invention to provide a self-lubricating material that will not damage glass or metal cylinder walls when used without liquid lubrication consistent with one or more of the preceding objects.

It is a further object of the invention to provide for ease and economy of manufacture by eliminating much of the machining of separate bearing rings from the material by making the bearing rings integral with the piston and forming a circumferentially continuous surface in the area of the piston where bearing surfaces are desired consistent with one or more of the preceding objects.

It is a further object to provide for effective transmission of heat between the piston and cylinder walls consistent with one or more of the preceding objects.

It is a further object of the invention to provide self-supporting composite structures usable as piston rings consistent with one or more of the preceding objects.

It is a further object of the invention to provide a new composite material achieving one or more of the preceding objects.

SUMMARY OF THE INVENTION

According to the invention, a piston comprises a base piston structure having a relatively thin bearing layer of self-lubricating material rigidly bonded, threaded, shrunk or swaged or otherwise secured onto the outer base surface of a base piston structure. Sufficient axial bearing area or bond shear area is provided on the piston to carry the loads imposed by the axial acceleration of the piston. The bearing layer extends around the full circumference of the cylindrical surface of the base piston structure or, in other forms of base piston structure, over the full lateral extent thereof.

The bearing layer comprises a plastic matrix reinforced by a first fibrous phase and a second particulate phase both of which are essentially homogeneously dispersed throughout the matrix. The fibers making up the first reinforcing phase are arranged essentially laterally and are continuous over at least two passes along the full lateral extent of the base surface. The bearing layer preferably further comprises metallic heat transfer paths dispersed throughout the area of the matrix and aligned in the radial or other thickness dimension of the matrix.

The fibers of the first reinforcing phase are of graphitic or lamellar crystal structure, act as solid lubricants and are resistant to oxidation and erosion under conditions of combustion engine usage. The particles of the second phase are also lubricating and temperature stable.

Preferably a preimpregnated tow of graphite fiber containing the second phase dispersed in a matrix is spirally wrapped around a cylinder base piston structure, cured and machined to final size to form the final piston apparatus. The tow itself may be spirally wrapped in spaced turns with a metal wire which will form the radial heat transfer paths when the tow is wrapped around a cylindrical base piston structure.

One of several thickness layers of fiber may be formed in the composite coating. The "coating" may be formed on a removeable mandrel to yield, after cure, a self-supporting structure such as a piston ring.

A split piston ring made up of several stacked and bonded composite layers affords high spring forces maintainable at high temperatures utilizing the high stiffness of the fibrous reinforcing phase.

The invention may be applied to noncircular shapes such as Wankel engine rotors and rectangular friction plates, as well as cylindrical pistons, and is also suited to the construction of split piston rings, such rings having improved self-lubricating properties, spring force, and strength, compared to rings machined from molded material or solid hot pressed graphite.

These and other objects, features and advantages of the invention will be apparent from the following detailed description with reference therein to the accompanying drawing in which

DETAILED DESCRIPTION OF PREFERRED EMBODIMENTS

Figure 1:
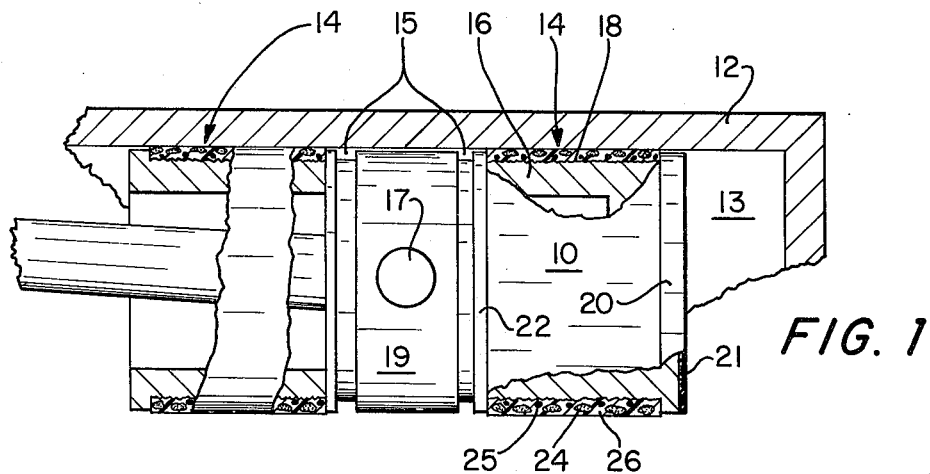
FIG. 1 is a partly sectioned plan view of piston-cylinder combustion engine apparatus according to a first embodiment of the invention.

Referring to FIG. 1, a piston 10 is mounted in a cylinder 12 of a combustion engine and defines therewith a combustion gas expansion/compression space 13 between the piston head and cylinder head. The combustion engine may be of internal or external combustion type.

The piston comprises an axially elongated, composite coating 14 mounted on a base piston structure 16 which has a threaded or grooved surface 18. The coating 14 is bracketed by flanges 20, 22 of the base piston structure. Flange 20 limits access of hot combustion gasses to coating 14 and further has a thermal insulating head coating layer 21, such as an anodized or conversion coating forming a two to five mil thick aluminum oxide layer.

The coating length is preferably at least one half of the piston length to maximize bearing area to support the side force components of the forces applied by expanding gasses to the connecting rod and thence to the crankshaft, such forces being normal to the wristpin and proportional to the sine of the angle between the connecting rod centerline and the cylinder centerline. An intermediate piston section accommodates a wristpin 17 and piston ring grooves 15. The coating may be interrupted at or continue through the intermediate section. Piston rings may be omitted in many uses. The coating 14 comprises a first fibrous reinforcement phase 24 and a second particulate reinforcement phase 25 homogeneously distributed throughout a resin matrix 26.

The piston is made as follows. A rough machined base piston structure is made of aluminum alloy or other metal having suitable physical and thermal properties for use in a combustion engine. The axial series of rough shallow grooves is then formed in base surface 18 of the piston. These grooves provide a surface enhancement ratio, i.e. ratio of actual surface area to planar projection thereof, of at least 2.0 to provide maximum adhesion of the bearing surface layer 14. The first fibrous reinforcement phase 24 is made of graphitic structure preferably comprising continuous carbonaceous filament tow. Such tows can be made by pyrolysis of rayon, PVC or polyacrylonitrile fibers followed by heating above the graphitization temperature or from other ceramic fibers including boron nitride or boron nitride coated metal wires. The tow is impregnated with high temperature plastic resin such as Ciba-Geigy P–105A polyimide. The second reinforcement phase 25 comprises a particulated solid lubricant such as molybdenum disulfide, tungsten disulfide, teflon powder, carbon monofluoride $(CF)_x$ powder.

The tows are commercially available products obtainable with or without preimpregnated resin therein. The solid lubricant particles may be dispersed in the resin before or after preimpregnation of the tow. But when maximum wear resistance is desired the solid lubricant is preferably dispersed in the resin varnish prior to impregnating the tow. Resins with solid lubricant particles therein are also known per se, e.g. Bemol Corporation's Feurlon brand molybdenum disulfide impregnated polymide resins. The tow is partially B-staged to sufficiently low (4–15 percent) solvent content to provide a windable condition and then wound about the base piston structure and heated to fully cure the resin.

The resin used should resist the maximum temperature encountered in use and should be thermosetting resin such as polyimide or phenolic. However, thermoplastics may also be used, e.g. polyamide, polyphenylene sulfide or polytetrafluoroethylene (PTFE) such as DuPont's Teflon T–30. Because of the low strength of PTFE, it is preferred for lightly loaded applications or where softness is desired as with glass cylinders. When PTFE is used, the dispersion can be used to impregnate the roving using several dips and drying cycles to build up the desired resin content. It is then wound and pressed at temperatures, on the order of 750°F.

The preimpregnated tow material is wound continuously about the base piston structure in the longitudinally elongated, radially recessed area defined between flanges 20, 22, thereof. The grooved or otherwise surface enhanced base surface 18 forms the base of the recess. The wound spiral of tow is sufficiently thick to build up an incremental thickness of coating extending beyond the circumference of flanges 20, 22 which can be machined after cure to a final incremental thickness determined by the specific application. Because of the high cost of the material and the desirability of heat transfer from the piston to cylinder, this thickness should be as thin as is consistent with the anticipated wear rate, 0.020 to 0.060 inch being suitable for most applications.

In order to provide the best solid lubricating properties, the filaments should have as close to a lamellar (graphite) crystalline structure as possible.

Figure 2:
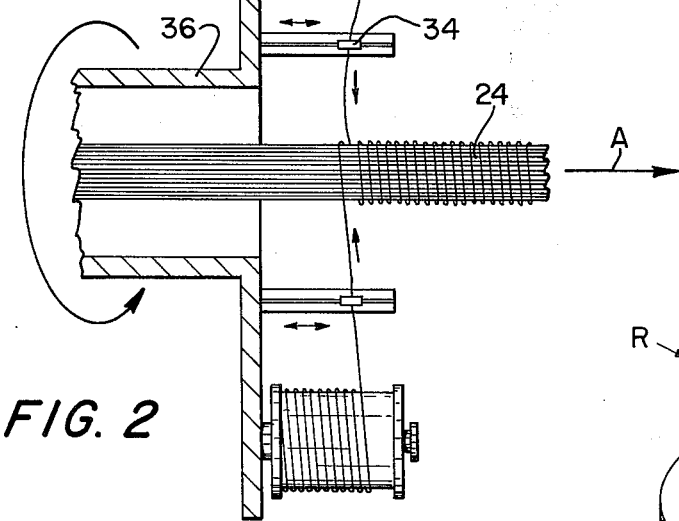
FIG. 2 is a sketch of the manufacturing arrangement used to enhance thermal conductivity, consistent with maintaining low wear and erosion, in the FIG. 1 apparatus.

Thermal conductivity of the bearing layer can be improved by wrapping the preimpregnated tow with silver, copper or other soft metallic wire to form a discontinuous metallic coating along the fiber reinforcement. As shown in FIG. 2, the metal wire 30, is played out from one or more spools 32 mounted on a rotating mandrel 36 and preferably in symmetrical pairs thereon for balance. The wires pass through guides 34, rotating with the spool on the hollow mandrel 36 to wrap a prepreg which is simultaneously moving axially as indicated by the arrow A. The spacing between metal wire turns is at least two metal wire diameters in order to provide adequate exposure of the solid lubricant in the resin base.

Figure 3:
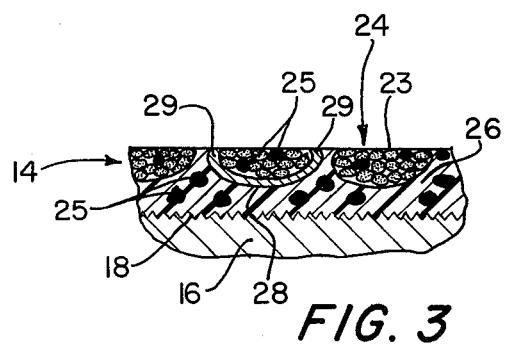
FIG. 3 is a magnified sectional view of a portion of the FIG. 1 apparatus after manufacture as described in connection with FIG. 2 and extended use in an engine.

FIG. 3 shows a portion of the piston apparatus of FIG. 1, made in accordance with the processing described above in connection with FIGS. 1–2, and after extended usage. The spiral wrapping 28 of metal wire is reduced to discontinuous half-turns including two radial legs 29. The component fibers of yarn 28 maintain their length continuity, and their resistance to separation is enhanced by the metal wire wrap. Particles 25 are dispersed in resin layer 26 both within and without the yarn 24. Resin layer 26 is a continuous matrix extending from within yarn 24 to the extended surface area of base surface 18.

Figure 4:
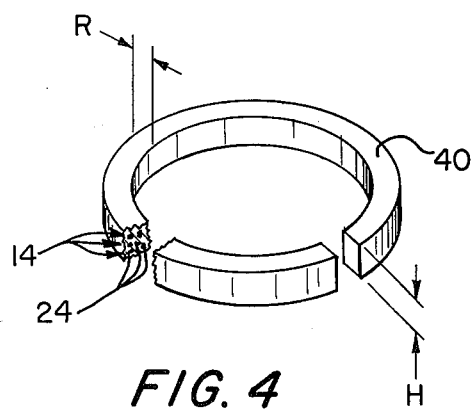
FIG. 4 is an isometric view of a further embodiment of the invention utilizing the composite material as a self-supporting structure.

FIG. 4 shows a split piston ring 40 comprising layers 14 of the FIG. 1 coating stacked in the height dimension H of the ring. The layers are bonded to each other in the course of curing. Such layers are stacked in the radial direction in narrow rings and in both radial and axial directions should greater width be required.

Those skilled in the art, once given the benefit of the foregoing disclosure, can make numerous variations from and other uses of the above described preferred embodiments. For instance, steel piston rings near piston ends can provide the shielding function performed by flange 20 in FIG. 1 and such flange may be eliminated. The FIG. 4 piston ring may be used in the FIG. 1 piston structure. The bearing layer length may be substantially reduced for low loading applications. It is therefore intended that the above disclosure shall be read as illustrative and not in a limiting sense, the present invention being limited solely by the scope and spirit of the appended claims.

What is claimed is:

1. Self-lubricating piston apparatus for a combustion engine comprising,
   means defining a base piston structure having an external wall,
   means defining a bearing surface layer for said structure bonded to said external wall and comprising a plastic matrix extending longitudinally along and over the full lateral extent of said base surface,
   means defining a first strengthening reinforcement and lubricating phase distributed in said matrix comprising a plurality of elongated plastic impregnated yarn of ceramic fibers of lamellar crystal structure at an external surface of said layer running the full lateral extent of said bearing surface layer and parallel to each other,
   means defining a second strengthening reinforcement and lubricating phase distributed throughout the longitudinal and lateral extent of said bearing surface layer comprising a dispersed particulated solid lubricant, and means defining heat transfer paths regularly distributed through said bearing surface layer for conducting heat from said external surface and said fibers through at least a portion of the thickness dimension of said bearing surface layer.

2. Piston apparatus in accordance with claim 1 wherein,
   said piston external wall is cylindrical and said reinforcing fibers are spirally wound thereon.

3. Piston apparatus in accordance with claim 1 wherein the base piston structure comprises a longitudinally elongated recess of its external wall underlaying the bearing surface layer.

4. Piston apparatus in accordance with claim 1 wherein said external wall has a surface enhancement ratio of at least 2.0.

5. Piston apparatus in accordance with claim 4 wherein said external wall is grooved.

6. Piston apparatus in accordance with claim 1 wherein said yarn comprises a metallic coating thereon which is discontinuous along the length of fiber reinforcement but provides multiple parallel heat transfer paths through the matrix from its outer surface to said external wall.

7. Piston apparatus in accordance with claim 1 wherein said piston external wall is cylindrical and said reinforcing fibers are spirally wound thereon,
   the base piston structure comprises a longitudinally elongated recess of its external wall underlaying the bearing surface layer,
   said external wall has a surface enhancement ratio of at least 2.0,
   said yarn comprises a metallic coating thereon which provides multiple parallel heat transfer paths through the matrix from its outer surface to said external wall,
   and further comprising means defining an annular gas shield at an axial end of said matrix.

8. Piston apparatus in accordance with claim 7 and further comprising,
   means defining an engine cylinder closely surrounding the external wall of said piston and comprising means for expanding a combustion gas mixture to drive the piston within said cylinder.

* * * * *